United States Patent [19]

Beaudrie

[11] Patent Number: 4,802,272
[45] Date of Patent: Feb. 7, 1989

[54] PROCESS FOR REFURBISHING CONTAINERS

[76] Inventor: Robert J. Beaudrie, 1038 Park Cir., Girard, Ohio 44240

[21] Appl. No.: 109,452

[22] Filed: Oct. 16, 1987

[51] Int. Cl.$^4$ .............................................. B23P 7/00
[52] U.S. Cl. .............................. 29/407.07; 29/407.08; 29/407.13; 29/407.16; 29/407.19
[58] Field of Search ........... 29/407.02, 407.07, 407.08, 29/407.13, 407.16, 407.19; 220/67; 413/2, 4, 11

[56] References Cited

U.S. PATENT DOCUMENTS

| | | | |
|---|---|---|---|
| 2,576,767 | 10/1951 | A'Hearn | 220/67 |
| 3,769,686 | 11/1973 | Massey | 29/470.5 |
| 4,655,359 | 4/1987 | Fairgrieve | 220/67 |

FOREIGN PATENT DOCUMENTS

| | | | |
|---|---|---|---|
| 2445517 | 7/1975 | Fed. Rep. of Germany | 220/67 |
| 6113100 | 12/1967 | Netherlands | 220/67 |

OTHER PUBLICATIONS

STAINLESS STEEL CONTAINERS, brochure of Container Products, Inc.

Primary Examiner—Timothy V. Eley
Attorney, Agent, or Firm—Fay, Sharpe, Beall, Fagan, Minnich & McKee

[57] ABSTRACT

A process for refurbishing used containers. The process includes cutting an end member from a sidewall of the used container. The sidewall is dedented to remove deformations therein. An indentation is then formed in the sidewall a preselected dimension from the cut end. The cut end is peripherally expanded to accommodate a new end member. The new end member may be formed from a conventional end member in which the seaming flange has been removed, and the end member inverted for receipt in the sidewall of the container. An axially extending leg portion of the new end member engages the indentation and a secure, sealing engagement is insured by welding the sidewall to the new end member along the indentation. Thereafter, a reinforcing chime may be applied to the terminal end of the sidewall.

22 Claims, 3 Drawing Sheets

PROCESS FOR REFURBISHING CONTAINERS

BACKGROUND OF THE INVENTION

This invention pertains to the art of storage containers and more particularly to stainless steel containers utilized by the food industry.

The invention is particularly applicable to refurbishing, reconditioning, or repairing used containers so that they may be used again with a significant savings of construction material and will be described with particular reference thereto. However, it will be appreciated that the invention has broader applications and may be advantageously employed in other container environments and applications.

Stainless steel containers are ideal for products that require high quality protection and where container re-use is anticipated, resulting in long term economic benefits. For example, the food industry, such as makers of syrups, extracts, beverages, alcohols, concentrates, and a variety of other food products, utilize stainless steel containers since stainless steel has no adverse effect on the flavors. Still other industries, such as the chemical industry that requires high purity chemicals and acids to be retained in a container without threat of contamination, utilize these containers. The stainless steel construction is extremely corrosion resistant thereby limiting tainting of the chemical. Still another area of widespread use is for products that may discolor readily. Perfumes, aromatic chemicals, drug products, oils, etc. all are subject to discoloration if contaminated.

The exceptionally long re-use life of stainless steel containers is extremely economical because they deliver years of trouble-free service. These containers are extremely durable even though subjected to extreme wear and tear.

Typically, containers of this type require the elimination of V-shaped crevices that would form between the head or base and the sidewall of the containers. U.S. Pat. No. 2,576,767 issued Nov. 27, 1951 to A'Hearn discloses on effective method and finished container product that resolves this problem. Elimination of these crevices is vital to cleanliness and sterility of the container since otherwise small particles of the container contents may be retained therein even after undergoing known flushing techniques. According to that patent, a groove is formed in the sidewall of the container adjacent the end face of the head or bottom of the container. This groove, deformation, or indentation then defines the region on which a later welding step completes and seals the crevice.

Although containers manufactured according to the method of the A'Hearn patent have met with substantial success, like other containers they are subject to wear and tear over an extremely long period of time. In order to refurbish or recondition these containers, it is necessary to remove the heads and bottoms from the sidewalls thereof so that the containers can undergo a dedenting process.

One known process for securing a new head or bottom to the sidewall of a used container is described in U.S. Pat. No. 3,769,686 issued Nov. 6, 1973 to Massey. As taught in that patent, the head flange is removed, as well as a portion of the sidewall of the container, so that the old head may be removed therefrom. Once the dedenting process is completed, either the old head, or preferably a new one, is inserted into the sidewall and a new groove defined to receive a terminal end of the sidewall. The terminal end is clamped in the groove defined by generally concentric flanges. The clamped arrangement is then bent concomitantly and laterally to cold form the metal. Thereafter, a weld is applied to define a continuous, water-tight joint. Nevertheless, this arragement still results in a crevice being formed between the sidewall and the head of the container.

It has been considered desirable, therefore, to provide a method of refurbishing or reconditioning used containers in a manner that provides a crevice-free container particularly useful for foods, chemicals, and other high quality products.

SUMMARY OF THE INVENTION

According to the subject invention, a process for reconditioning containers includes the steps of cutting an end member from a used container, forming an indentation in the sidewall of the container, inserting a new end member, and welding the sidewall along the indentation for sealing the end member to the sidewall.

According to a more limited aspect of the invention, the sidewall is radially expanded before the new member is inserted therein.

According to another aspect of the invention, the sidewall is dedented after the end member is cut therefrom.

According to a further aspect of the invention, a new end member has the seaming flanges removed therefrom, the end member is inverted, and thereafter inserted into the used container.

According to a still further aspect of the invention, a reinforcing chime is fastened over the sidewall after the new end member is secured thereto.

A principal advantage of the invention resides in the economic benefits attained through refurbishing or reconditioning used containers.

Still another advantage of the invention resides in the ease of changeover and repair of a used container.

Still another advantage of the invention is found in a refurbished container structure that eliminates crevices.

Still other advantages and benefits of the invention will become apparent to those skilled in the art upon a reading and understanding of the following detailed description.

BRIEF DESCRIPTION OF THE DRAWINGS

The invention may take physical form in certain steps, and arrangements of steps, a preferred process and embodiment of which will be described in detail in this specification and illustrated in the accompanying drawings which form a part hereof, and wherein.

DETAILED DESCRIPTION OF THE PREFERRED METHOD AND EMBODIMENT

Figure 1:
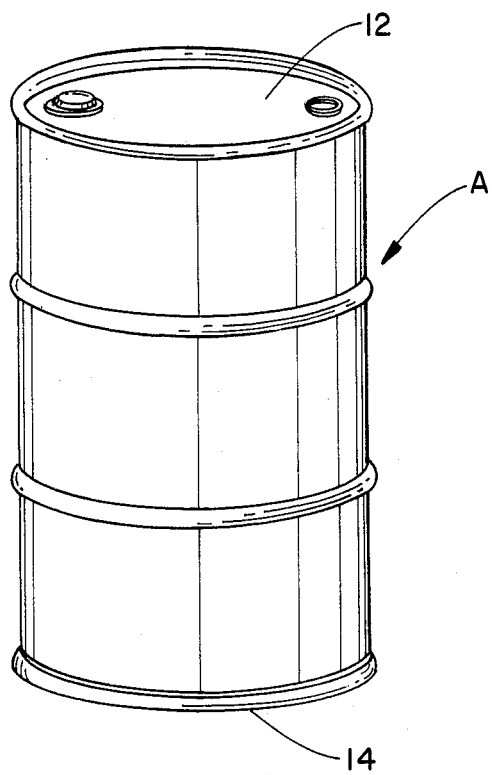
FIG. 1 is a perspective view of a stainless steel container.

Referring now to the drawings wherein the showings are for purposes of illustrating the preferred method and embodiment of the invention only and not for purposes of limiting same, the FIGURES show a container A for use in storing food products, high purity chemicals, acids, perfumes, aromatic chemicals, and still other materials.

More particularly, the container includes a generally cylindrical sidewall 10 having first and second spaced end members 12, 14. The first and second end members are commonly referred to as the head or bottom, respectively, of the container although for purposes of the following discussion, reference to an end member can apply equally to either the head or bottom of the container. The containers are constructed of various materials, such as carbon steel, stainless steel, and the like and also range in various sizes from 15 to 55 gallon volumes. Nevertheless, the particular material of construction or size of the container is not deemed critical to the process of the subject invention.

Figure 2:
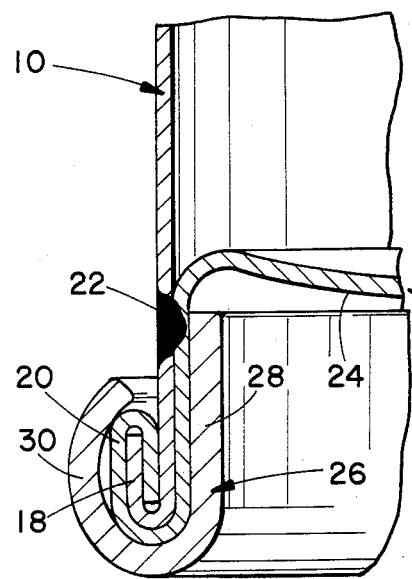
FIG. 2 is an enlarged cross-sectional view showing a conventional end member connection with a sidewall of a used container.

A conventional prior art closure construction is illustrated in FIG. 2 in which the side wall is sealingly secured to an end member 12. (Reference numeral 14 indicates a corresponding end disposed opposite the end 12, which is understood to be similar thereto.) The sidewall includes a turned-back flange 18 that matingly engages with a flange 20 of the end member. The flanges 18 and 20 are pressed and clamped together to form a secure interconnection between the end member and the sidewall of the container. Further, a weld bead 22 is defined at the juncture of the sidewall with the generally planar end face 24 of the end member. As described in U.S. Pat. No. 2,576,767, this construction eliminates a crevice typically found between the end member and the sidewall of a container. A reinforcing chime is generally J-shaped in cross-section having an elongated leg portion 28. An arcuate flange 30 is adapted for retaining receipt over the clamped flanges 18, 20 of the sidewall and end member.

Figure 3:
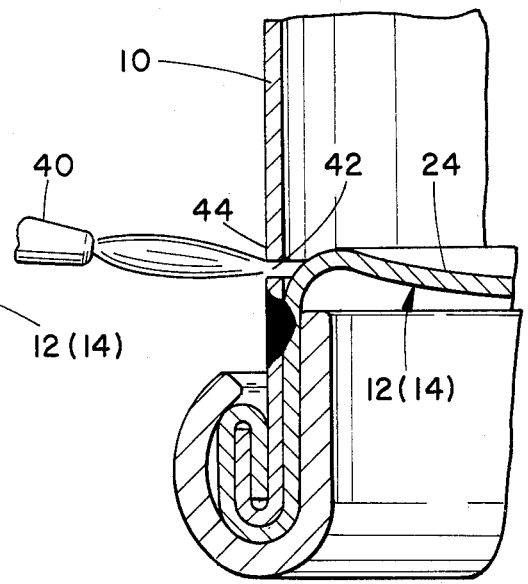
FIG. 3 shows removal of the end member from the sidewall of a used container.

With reference now to FIG. 3, removal of an end member from the sidewall of the container is illustrated. According to the preferred method, the end member is removed through a cutting operation at an area disposed axially inward from the weld bead and reinforcing flange of the container. Since used containers are sometimes distorted, this cut area will vary but ideally is located approximately 13/16 of an inch from the end member. According to preferred method, a torch 40 is disposed generally perpendicular to the sidewall of the container and provides a precise cut at area 42 to define a cut or terminal end 44 of the sidewall. The container is mounted in a welding positioner so that the sidewall is perpendicularly disposed to the torch. The positioner provides rotational movement of the container at an approximate speed ranging from 0 to 100 inches per minute. After one end member has been cut from the sidewall, the container is axially rotated 180° to dispose the other end member for cutting. In this arrangement, the welding positioner must be able to expand against the inside of the sidewall to hold the container during the second cutting process. Alternatively, first and second torches are disposed at opposite ends of the container and as the container rotates both ends are simultaneously cut. Of course, still other arrangements of removing an end member from the sidewall are within the scope and intent of the subject invention.

Figure 4:
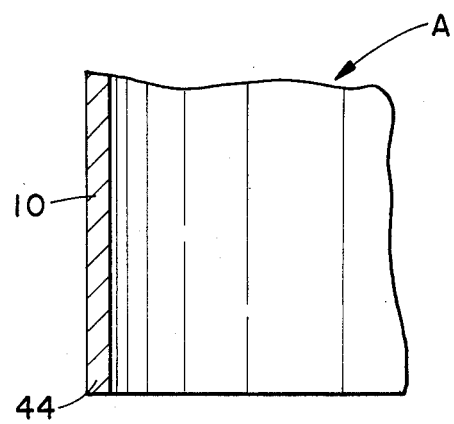
FIG. 4 is a cross-sectional view of the sidewall after it has been dedented.

Once the end members are removed from the container, a generally hollow, cylindrical sidewall remains (FIG. 4). It will be understood that after continued use, the sidewall of the container is typically dented at various locations on its surface. Dedenting is, therefore, required. Although other processes of dedenting may be used, the preferred method employs a horn press with an ironing die made to the same radius as the sidewall. The cylindrical sidewall is placed over an anvil-like bottom die and the press stroke preselected for sufficient clearance between the top and bottom die shoe to accommodate the thickness of the container sidewall. The sidewall is then struck over the surface by the die shoe as the cylindrical sidewall is rotated in the press. As shown in FIG. 4, the dedenting process is substantially complete so that sidewall 10 has had all deformations removed therefrom.

Figure 5:
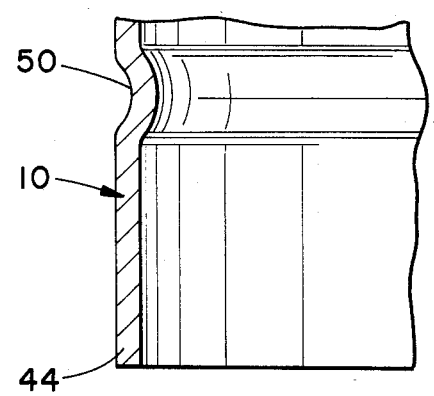
FIG. 5 illustrates formation of an indentation in the sidewall.

In order to receive a new end member for a refurbished container, a knurl or indentation 50 is formed in the sidewall (FIG. 5). The indentation is circumferentially continuous and formed exactly two inches from the terminal end of the sidewall. An indentation is formed at each end of the sidewall to receive first and second end members, i.e., a new head and new bottom. According to a preferred method, the indentation is formed between two sets of rolls, each set containing a male and female roll designed to accommodate the thickness of the sidewall. The indentation extends radially inward approximately one-quarter to three-eights inches from the original radial dimension of the sidewall.

Thereafter, the sidewall is acid cleaned to remove any impurities from prior storage of materials in the container. By way of example, the sidewall may be placed in a heated tray filled with acid to a level up to the indentation. A mixture of hydrofluoric and nitric acid has been used with success. The shell remains in the heated acid solution and then is inverted and repeated for the other terminal end of the sidewall.

Figure 6:
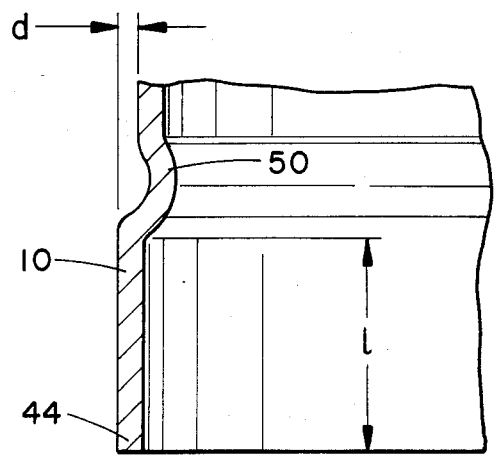
FIG. 6 generally shows the radial expansion of the sidewall.

The axially outer terminal ends 44 of the sidewall are preferably expanded radially outward to increase the peripheral or circumferential dimension of the sidewall. This expansion is denoted by the radial dimension "d" in FIG. 6 that facilitates receipt of a new end member as will become more apparent hereinbelow. The expanding step is conducted on expandable dies over which the sidewall can be placed, and the dies only extend axially into the sidewalls a dimension "1". This axial dimension "1" is approximately one and one-half inches which, as is apparent, is less than the axial inward spacing of the indention 50 two inches from the outermost edge of the terminal end 44. In this manner, the outer ends of the sidewall are expanded without effecting the indentation.

Figures 7, 8:
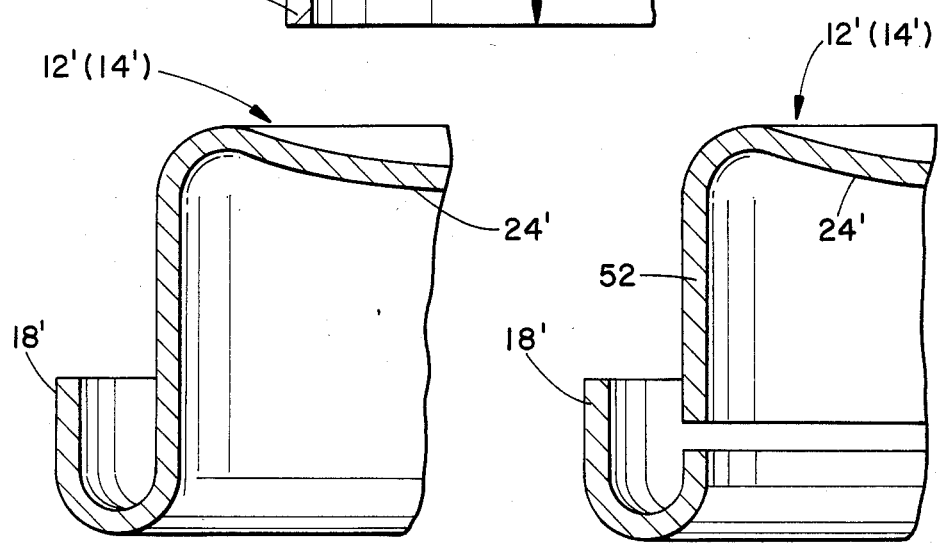
FIG. 7 is a cross-sectional view of one edge of a new end member.
FIG. 8 shows removal of a seaming flange from the new end member.

A new end member 12' (14') (FIG. 7) is provided for receipt into the refurbished sidewall. Normally, the end members are as a standard product having the end face 24 and an outwardly extending turn back flange 18' as in FIG. 7. As apparent from FIG. 2, conventional constructions insert the end face 24' into the sidewall of a new container while the flange 18' is disposed axially outward therefrom. According to the subject invention, though, the flange 18' is removed from a new end member. Particularly, the seaming flange is cut, for example in a lathe or comparable machine (FIG. 8), so that an approximately one inch leg portion 52 extends axially from the end face 24'. The seaming flange can be discarded. Alternatively, a new end member without any seaming flange can be provided.

Figure 9:
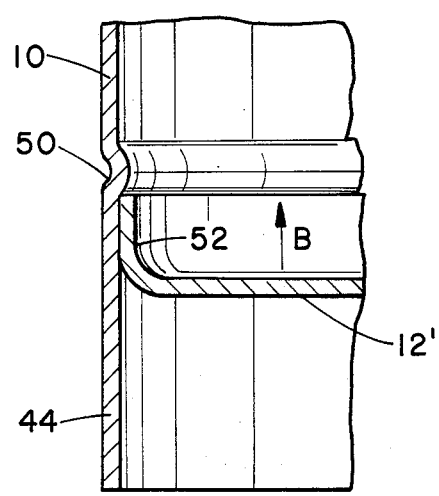
FIG. 9 shows the insertion of a new end member into a used container sidewall.
Figure 10:
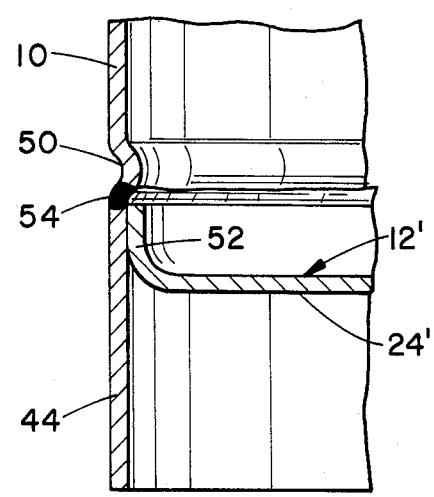
FIG. 10 generally illustrates the welding step for interconnecting the sidewall to the new end member; and, FIG. 11 shows the attachment of a reinforcing chime to the sidewall of a refurbished container.

As particularly illustrated by arrow B in FIG. 9, the new end member 12' has been inverted and then inserted into the expanded terminal end of the sidewall. That is, the leg portion 52 is initially inserted axially into the sidewall and pushed in far enough to provide a tight fit between the container sidewall at the indentation. This orientation of the new end member allows some recapture of the volume lost resulting from removal of the old end member. Approximately one inch as measured along the longitudinal axis of the container is lost when comparing the refurbished container to the original used container. More specifically, removal of the old end member is maintained closely adjacent to the end face of the old end member to minimize the loss in volume. Thereafter, the indentation is formed two inches inward from the terminal end while the leg portion 52 of the new end member has an approximate one inch dimension to recover a portion of this volume. This slight variation in volume is not deemed critical in comparison with the substantial cost savings from refurbishing a used container versus providing a brand new container.

A weld is next formed at the indentation 50 of the sidewall to sealingly secure the end member to the sidewall. Particularly, this construction eliminates any formation of a crevice between the sidewall and the end member so that the refurbished container can be used in the specialized industries described above. To achieve this welded interconnection, the unwelded, assembled container is preferably placed on a welding positioner for rotating the container. The inside of the drum is purged of any oxygen and inert gas is injected as a welding backup. The equipment is then rotated at approximately 45 inches per minute to obtain a satisfactory weld. Of course, other welding arrangements can be used without departing from the scope and intent of the subject invention.

The entire weld area is immersed in water while the drum is pressurized to 15 psi. Air bubbles should quickly evidence any potential leak. Alternatively, a soapy solution is applied over the entire weld area while the drum is pressurized. Any detected leaks can be repaired with a hand torch.

Figure 11:
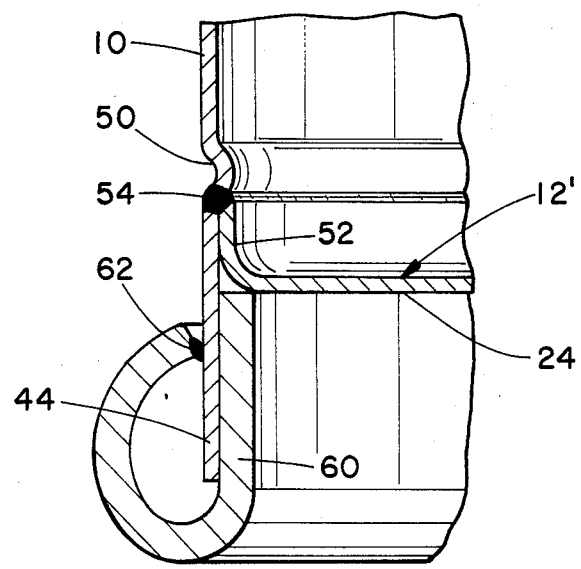

A new reinforcing chime 60 is received over the terminal end 44 of the sidewall. The chime provides an extra layer of protection to the sealed container as is known in the art. As shown in FIG. 11, the reinforcing chime is tack welded at 62 to maintain a secure engagement with the terminal end of the sidewall. Preferably, the weld regions are spaced at peripheral areas of the sidewall. Lastly, the entire refurbished container is acid cleaned inside and out, rinsed, and finally tested and inspected.

The invention has been described with reference to the preferred embodiment and method of refurbishing a container. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A process for reconditioning containers comprising the steps of:
   cutting an end member from a sidewall of a used container to define a terminal end;
   forming an indentation on said sidewall a preselected dimension from said terminal end;
   inserting a new end member having an extending leg portion for receipt in the sidewall and engagement with the indentation, said inserting step including positioning said leg portion for initial receipt in said sidewall; and,
   welding said sidewall along said indentation for sealing said new end member to said sidewall.

2. The process as defined in claim 1 further comprising the step of radially expanding said sidewall before said inserting step to facilitate receipt of said new end member therein.

3. The process as define in claim 2 wherein said sidewall expanding step is limited from the terminal end to a region disposed axially outward from said indentation.

4. The process as defined in claim 1 further comprising the step of dedenting the sidewall after said cutting step to remove deformations in said sidewall.

5. The process as defined in claim 1 wherein the indentation is formed continuously around the periphery of said sidewall.

6. The process as defined in claim 1 wherein said new end member inserting step includes the steps of providing a new end member having a seaming flange, and cuting said seaming flange from said new end member to form said extending leg portion.

7. The process as defined in claim 1 further comprising the step of securing a reinforcing chime on said sidewall axially outward from said new end member.

8. The process as defined in claim 1 further comprising the steps of cutting a second end member from a sidewall of a used container to define a second terminal end, forming a second indentation on said sidewall a preselected dimension from said second terminal end, inserting a second new end member having an extending leg portion for receipt in the sidewall and engagement with the indentation, said second new end member inserting step including positioning said leg portion of said second new end member for initial receipt in said sidewall, and welding said sidewall along said second indentation for sealing said second new end member to said sidewall.

9. The process as defined in claim 8 wherein said steps further comprise the step of performing said welding along an exterior surface of said sidewall.

10. The process as defined in claim 1 wherein said welding step further comprises the step of performing said welding along an exterior surface of said sidewall.

11. A process for refurbishing containers comprising the steps of:
   removing an end member from a sidewall of a used container to expose a terminal end;
   forming an indentation on said sidewall axially inward from said terminal end;
   inserting a new end member for receipt in the sidewall of the used container, said new end member having a portion extending axially from an end face, said leg portion received initially in said sidewall and disposed more closely adjacent said indentation than said end face; and, securing said new end member to the sidewall.

12. The process as defined in claim 11 wherein said removing step includes cutting said end member from the sidewall of the used container.

13. The process as defined in claim 11 wherein said securing step includes welding said new end member to said sidewall.

14. The process as defined in claim 11 comprising the further step of spreading said terminal end of said sidewall after said removing step to accommodate said new end member.

15. The process as defined in claim 14 wherein said spreading step is axially limited to less than two inches.

16. The process as defined in claim 11 comprising the further step of dedenting said sidewall after said removing step.

17. The process as defined in claim 11 comprising the further step of removing a seaming flange from said new end member to define said extending leg portion, said flange removing step being before said inserting step.

18. The process as defined in claim 11 comprising the further step of fastening a chime over said sidewall after said securing step.

19. The process as defined in claim 11 wherein said securing step includes welding along an exterior surface of said sidewall to secure said new end member to the sidewall.

20. The process as defined in claim 11 wherein said securing step includes welding said new end member to said sidewall along said indentation.

21. A process for refurbishing a used container of a first predetermined volume having a sidewall and an end member defined by an end face and an axially extending leg portion, said end face disposed axially inward from said leg portion, said end member being secured to the sidewall by a weld bead on the sidewall adjacent an interconnecting area of said end face and leg portion, said process comprising the steps of:

cutting said end member from the sidewall of the used container at an area disposed axially inward from said weld bead to define a terminal end;

forming an indentation on said sidewall axially inward a preselected dimension from said terminal end;

inserting a new end membr having an extending leg portion for receipt in the sidewall adjacent the indentation, said inserting step including positioning said leg portion of said new end member for initial receipt in said sidewall; and, welding said sidewall to said new end member leg portion adjacent said indentation to form a refurbished container having a second predetermined volume substantially identical to said first preedetermined volume.

22. The process as defined in claim 21 wherein said welding step further comprises the steps of performing said welding along an exterior surface of said sidewall.

* * * * *